US009461905B2

(12) United States Patent
Schrecke et al.

(10) Patent No.: US 9,461,905 B2
(45) Date of Patent: Oct. 4, 2016

(54) METHOD FOR INDIRECT LINK CHARACTERIZATION AND QUALITY MEASUREMENT OF A DIGITAL NETWORK

(71) Applicant: RAYTHEON COMPANY, Waltham, MA (US)

(72) Inventors: Gregory Scott Schrecke, Upton, MA (US); Steven Alan Davidson, Acton, MA (US); Matthew Aaron Kahn, Maynard, MA (US); Mu-Cheng Wang, Acton, MA (US); Mark Warren Henry, Wellesley, MA (US)

(73) Assignee: RAYTHEON COMPANY, Waltham, MA (US)

( * ) Notice: Subject to any disclaimer, the term of this patent is extended or adjusted under 35 U.S.C. 154(b) by 623 days.

(21) Appl. No.: 13/886,001

(22) Filed: May 2, 2013

(65) Prior Publication Data

US 2014/0328205 A1    Nov. 6, 2014

(51) Int. Cl.
*H04L 12/26*    (2006.01)
*H04L 1/20*    (2006.01)

(52) U.S. Cl.
CPC ........... *H04L 43/0894* (2013.01); *H04L 1/205* (2013.01); *H04L 1/203* (2013.01)

(58) Field of Classification Search
None
See application file for complete search history.

(56) References Cited

U.S. PATENT DOCUMENTS

| | | |
|---|---|---|
| 7,180,858 B1 | 2/2007 | Roy et al. |
| 2006/0083168 A1 | 4/2006 | Prakash |
| 2007/0025374 A1* | 2/2007 | Stefan ................. H04L 63/0227 370/401 |
| 2007/0239889 A1* | 10/2007 | Mochida ................. H04L 69/16 709/237 |
| 2007/0291782 A1* | 12/2007 | Basso ..................... H04L 69/16 370/428 |
| 2008/0062876 A1 | 3/2008 | Giroux et al. |
| 2008/0215883 A1* | 9/2008 | Fok ..................... H04L 63/0869 713/167 |
| 2009/0271508 A1* | 10/2009 | Sommers ............ H04L 43/0829 709/224 |
| 2009/0293114 A1* | 11/2009 | Mustafa .............. H04L 63/0227 726/13 |
| 2011/0194453 A1 | 8/2011 | Yamasaki |

FOREIGN PATENT DOCUMENTS

| | | |
|---|---|---|
| EP | 1 535 459 | 6/2005 |
| EP | 1 698 117 | 9/2006 |
| EP | 1 848 152 A1 | 10/2007 |
| EP | 2 359 628 | 8/2011 |

OTHER PUBLICATIONS

Written Opinion of the International Searching Authority for International Application No. PCT/US2014/036113, filed Apr. 30, 2014, Written Opinion of the International Searching Authority mailed Nov. 28, 2014 (9 pgs.).
International Search Report for International Application No. PCT/US2014/036113, filed Apr. 30, 2014, International Search Report dated Nov. 19, 2014 and mailed Nov. 28, 2014 (6 pgs.).
Invitation to Pay Additional Fees for corresponding International Patent Application No. PCT/US2014/036113, filed Apr. 30, 2014, Invitation to Pay Additional Fees mailed Sep. 8, 2014 (5 pgs.).

* cited by examiner

*Primary Examiner* — Mounir Moutaouakil
(74) *Attorney, Agent, or Firm* — Lewis Roca Rothgerber Christies LLP

(57) ABSTRACT

Method for determining link characteristics of a network link including: selecting or configuring one or more existing network traffic packets with one or more requirements when necessary, wherein the one or more requirements include a receiving network node having knowledge about the packets it should receive; transmitting the selected one or more network traffic packets from a transmitting network node to the receiving network node; and examining the transmitted selected one or more network traffic packets to determine the link characteristics of a network link between the transmitting network node and the receiving network node, according to said knowledge about the packets.

5 Claims, 5 Drawing Sheets

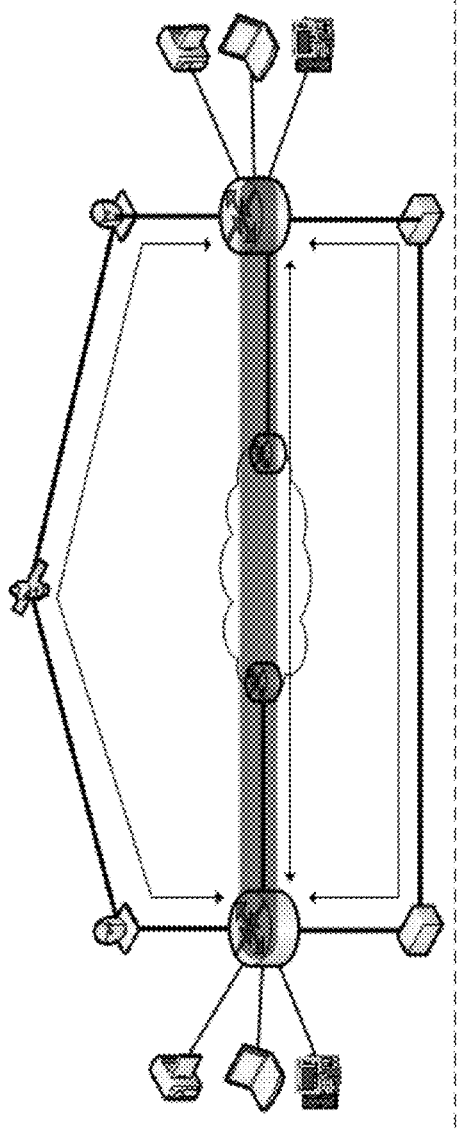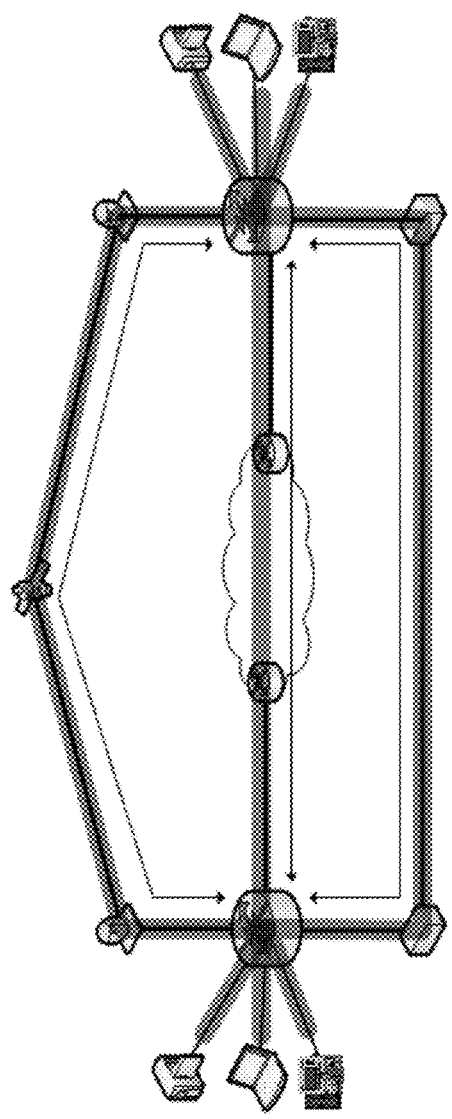

METHOD FOR INDIRECT LINK CHARACTERIZATION AND QUALITY MEASUREMENT OF A DIGITAL NETWORK

FIELD OF THE INVENTION

The present invention relates to a method for indirect link characterization and link quality measurement of a digital network.

BACKGROUND

Digital networks and network communications (wired and/or wireless) are increasingly being used as distributed computing and communication become more ubiquitous. In most communication networks data routing is a major element of the network performance. Routing algorithms determine the specific choice of route for each frame of data.

For example, in packet switching networks, routing algorithms control the transmission of logically addressed packets from their source toward their ultimate destination through intermediate network nodes.

To determine the network topology and potential routing paths, a routing protocol is required. A routing protocol specifies how routers and layer three switches coordinate to select the data routes between any two nodes in a digital network. A routing protocol shares network connectivity and path metrics first among immediate neighbors, and then throughout the network to distribute knowledge of the topology of the network. The routing protocol uses this knowledge of the path metrics and connectivity to select the best paths for data flowing in the network.

A network link is the physical and logical network component used to interconnect hosts or nodes in the digital network. A link protocol is a set of processes and standards that operate between adjacent network nodes of a local area network segment or a wide area network connection.

There are many ways to measure the performance of a link that is part of a digital network. Complicating that measurement, often resources and network access may be administratively or physically limited for such measurements and characterizations. For example, the underlying intermediate networks may not provide access to management data or make use of proprietary data types. A direct (conventional) measurement of network performance requires either tapping into the metrics of a directly connected network interface, and/or sending specially-crafted probe traffic, which adds significantly to network load and modifies the measurement it seeks to make.

Current solutions for this characterization typically require either tapping into the metrics of a directly connected network interface, and/or the generating and measuring of test data streams. These current solutions also require time synchronization between network elements to measure asymmetric latency and jitter. The current solutions lack the dynamics required to provide proper characterization of changing network conditions, or may introduce additional overhead data which further wastes network resources and thus influences the very measurements being made. Additionally, these dynamic measurements are generally a costly solution.

Existing network characterization techniques are not sufficient to support routing protocols for Network of Networks (NoN), and mobile ad-hoc network (MANET) applications. In NoNs the issue is that the routing devices only have knowledge of their local links to the edges of the autonomous systems to which they are interconnecting, which are generally much different than the actual underlying networks over which the data will flow. For the purposes of this disclosure, a network link is any path between two managed endpoints. This may be a direct link, or contain an entire intermediate network. For MANETs, network conditions change frequently due to environmental conditions and node mobility, and a way to continuously characterize link performance for input to the routing algorithms is required to provide efficient link utilization.

Moreover, proprietary multi-metric routing protocols such as Cisco EIGRP™ use locally configured and calculated metrics when the network forms based on statistics read directly from the local network interfaces. However, by looking only when the network forms, nothing is learned from the actual network during operation.

SUMMARY OF THE INVENTION

Link characteristics are a necessary input when performing optimized data transfer, load balancing, and other important network management and routing functions. The absence of this information limits the ability of the network management functions to make informed decisions and otherwise function as needed. When network link characteristics are required, but not directly available due to resource and network access limitations, an indirect method is needed. The present invention, which provides an effective solution to gathering the needed characteristics, utilizes indirect methods to infer network quality and capability In some embodiments, the present invention is a method executed by one or more processors for determining link characteristics of a network link. The method includes: selecting or selecting and configuring one or more existing network traffic packets with one or more requirements, wherein the one or more requirements include a receiving network node having predetermined knowledge about the packets it should receive; transmitting the one or more selected network traffic packets from a transmitting network node to the receiving network node; and examining the transmitted one or more network traffic packets to determine the link characteristics of a network link between the transmitting network node and the receiving network node, according to said predetermined knowledge about the packets.

In some embodiments, the link characteristics is a link loss and the method further includes: a) determining whether an existing network traffic packet includes data that is unique to said existing network traffic packet; b) adding data to said existing network traffic packet that is unique to said existing network traffic packet, if said existing network traffic packet does not include data that is unique to said existing network traffic packet; c) transmitting said network traffic packet including said unique data to a receiving network node; d) extracting said unique data from received network traffic packet; e) repeating steps a to d for a predetermined period of time; and f) comparing a number of received network traffic packets to a number of expected network traffic packets received by the receiving network node to determine whether there are any missing packets transmitted after said previously received network traffic packet and before said network traffic packet to determine said link loss.

In some embodiments, the link characteristics is a link delay and the method further includes: including a transmit time within an existing network traffic packet; transmitting the network traffic packet to a receiving participating network node, by a transmitting network node; sending a response to the transmitting network node from the receiving participating network node; and recording the time the response was received from the receiving participating network node; and calculating the link delay as the difference between the transmit time and the time the response was received from the receiving participating network node, minus the processing time of the receiving participating network node.

In some embodiments, the link characteristics is a link bandwidth and the method further includes: transmitting a first traffic packet to a receiving participating network node, by a transmitting network node; transmitting a second traffic packet to the receiving participating network node, by the transmitting network node; recording the time when last bit of the first traffic packet is received at the receiving node; recording the time when last bit of the second traffic packet is received at the receiving node; and determining the link bandwidth as the size of the second packet divided by the time difference between when the last bit of the first packet is received and when the last bit of the second packet is received, at the receiving node.

In some embodiments, the link characteristic is a link bandwidth and the method further includes: transmitting a first packet to a receiving participating node by a transmitting network node; transmitting a sequence of data packets immediately following each other from the transmitting node to the receiving node; recording the time when the last bit of the sequence of data packets is received and recording the size of the sequence of received packets; and determining the link bandwidth as the size of the sequence of packets not including the first packet divided by the time difference between when the last bit of the first packet is received and when the last bit of the last packet is received at the receiving node.

In some embodiments, the link characteristics is a link jitter and the method further includes: transmitting a plurality of traffic packets to a receiving participating network node, by a transmitting network node, on a deterministic time schedule; recording the time of each identified message which is configured a priori; computing a time difference from the current to the previous traffic packet with respect to the transmit time schedule, by the receiving participating network node; and calculating the link jitter from the delta time measurements, by the receiving participating network node.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein:

FIG. 1A depicts a routing path calculated by a typical routing protocol.

FIG. 1B depicts a routing path calculated by a routing protocol using the characteristic information provided by the present invention, according to some embodiments of the present invention.

DETAILED DESCRIPTION

Figure 2:
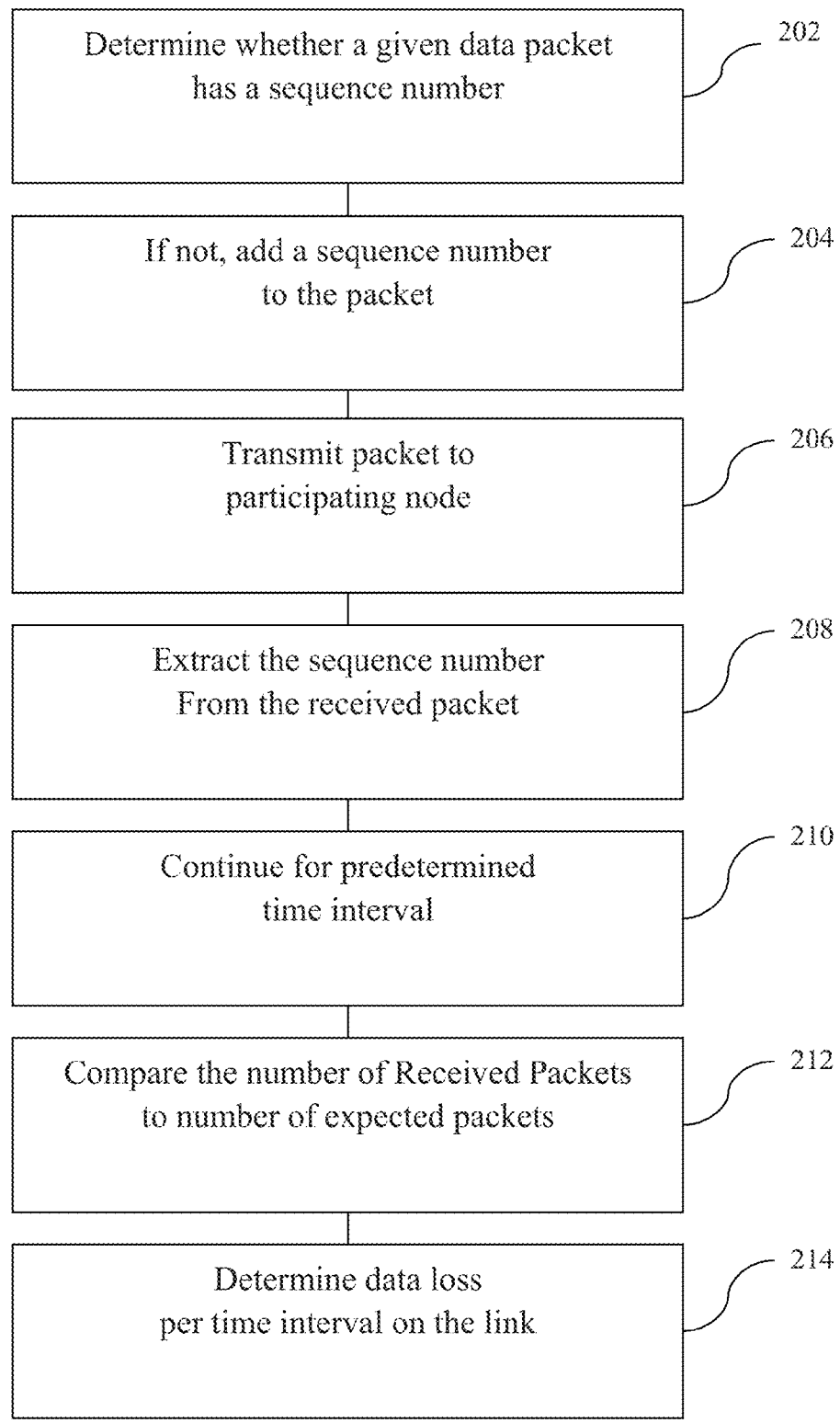
FIG. 2 shows a process flow chart for calculating a measure of link loss, according to some embodiments of the present invention.

The present invention is a network device (e.g., a computer or embedded device) implemented method by which routing protocol or other existing messages can be used to characterize the network and its links to improve routing topology and provide for equal and/or unequal cost load balancing and other network optimizations. The method of the present invention can be used to design or modify new or existing routing protocols, for example executing on a gateway or a router. In some embodiments, the method of the present invention executes on one or more processors of a router or other networking device that implement routing protocols. The present invention provides indirect methods of link quality characterization that when taken together are used to form a complete network picture (topology) to provide efficient data transmission, load balancing, and optimized link utilization. The present invention may also be used to measure network conditions for logistics purposes such as service level agreements and billing. Existing techniques to provide this characterization require sending significant amount of test data and specific measurement software.

In some embodiments, routing protocol hello packets (which are native to and required by routing protocols already and do not impose additional network burdens) are configured to be transmitted to neighbor nodes and/or networks at predictably deterministic intervals. Using this deterministic data, and employing sequence numbering and local time stamping, the protocol according to the present invention calculates link loss, link delay, link bandwidth and link jitter. This way, the participating nodes themselves do not need time synchronization. Additionally, using a packet-pair technique to transmit pairs of known sized data messages, the bandwidth of the link can be estimated as well. Using this indirectly measured data, the invention is able to infer, with a high degree of certainty, network conditions, quality, and characteristics.

In some embodiments, the present invention uses the routing protocol messages or other existing messages to serve as probes in the same way that the hello packets are used, as described above. Existing messages and protocol state machines are examined and possibly modified to ensure predictable deterministic send timing as well as the identification of existing data that can be used for sequencing. In some embodiments, protocol state machine details are essential information when determining which messages meet the requirements of the invention. For example, careful examination of protocol messaging will determine which messages are good candidates for loss measurements based on their periodicity, or which messages are good candidate for bandwidth measurements based on their transmission time relative to other messages.

In some embodiments, the present invention uses existing messages to calculate delay, bandwidth, loss and jitter of a link. In some embodiments, the present invention uses specialized probe messages to measure the bandwidth of a network link, without imposing more than an insignificant amount of additional traffic by using spare fields (bits) in otherwise routine packet traffic. In some embodiments the present invention uses modified versions of existing messages to calculate loss and jitter of a link. By using the routing protocol messages slightly differently, the present invention increases their usefulness greatly. This technique can be applied to any routing protocol or to any other existing network messages.

Using the method of the present invention (for example, when using an existing or developing a new routing protocol) allows the calculation of network loss, bandwidth, delay, and jitter, without the additional overhead of introducing measurement packets. This information can then be used to determine best routes for a given traffic type, and also provide equal or unequal cost load balancing.

FIG. 1A depicts a routing path calculated by a typical routing protocol. In this example, the perceived bandwidth is 1 Gbps, perceived delay is 10 ms, perceived jitter is 5 ns, and the perceived loss is zero. These parameters are all determined on the router's local outbound interface statistics and configuration with no knowledge of the entire path being available or used. As shown, the routing protocol selects the path through the carrier network for all the network traffic, regardless of their type. That is, this solution uses the metrics that the user supplies statically, or that are inferred from the local high speed connection (Gigabit Ethernet in this case), which don't reflect actual network conditions over the circuit switched path.

FIG. 1B depicts a routing path calculated by a routing protocol using the characteristic information provided by the present invention, according to some embodiments of the present invention. The present invention enables the network to adapt to changing conditions due to node mobility, RF interference, weather, hardware failures, etc. The measurements are made continuously or periodically in real time and therefore the network routing topology changes dynamically with the network conditions. For example, due to node mobility, previously preferred links may now be subject to higher losses to one or more neighbors and the network would then adapt and no route loss sensitive traffic over that route. Furthermore, the invention allows the network to provide specific routes to meet specific traffic requirements. For example, voice over IP (VoIP) requires low delay and jitter, and very low loss, streaming video typically is not sensitive to long delay, but requires sufficient bandwidth and low jitter, and command and control data doesn't require much bandwidth, can tolerate jitter, but requires low loss.

As shown in FIG. 1B, the routing protocols selects the "SATCOM" path for streaming video, because the measured bandwidth is high, the delay is constant but high and the loss is low, which suits the video streaming applications. Similarly, in the case of VoIP, the routing protocols selects the "Leased Line" path, because the measured bandwidth is sufficient, the delay is low and constant and the jitter is low, which suit best the VoIP applications. The router may select the "Carrier Network" path for all other types of traffic. The carrier network is selected for this traffic because even though it has continually changing bandwidth, loss, and delay/jitter as measured across the intermediate network, it is inexpensive but meets the needs of the non-video/VoIP traffic. This example demonstrates the benefits of the current invention when integrated into a routing protocol to provide different paths based on link characteristics and traffic types.

In some embodiments, the method of the present invention selects (without configuring the network traffic packets) or selects and configuring one or more existing network traffic packets with one or more requirements. The one or more requirements may include a receiving network node having predetermined knowledge about the packets it should receive. The invention then transmits the selected network traffic packets from a transmitting network node to a receiving network node; and examines the transmitted network traffic packets to determine the link characteristics of a network link between the transmitting network node and the receiving network node, according to said predetermined knowledge about the packets.

In some embodiments, the method of the present invention characterizes network conditions and link quality using routing protocol messages without relying on local metrics derived from directly interrogating the network interface or attached devices or the injection of additional (test) packet streams. In some embodiments, the method of the present invention includes specific information in routing protocol messages and levies a few requirements on protocol participants to determine such characteristics. The requirements include deterministic transmit times for some of the packets and the ability to modify and/or tag specific packets with additional information, if needed, to help the receiver measure characteristics. The additional information, as previously discussed, may include sequence numbers, timestamps, or other implementation specific data. Using the method of the present invention, when developing a routing protocol, allows for the calculation of network loss, bandwidth, delay, and jitter without the additional overhead of introducing measurement packets.

In some embodiments, the method of the present invention uses sequence numbers in the periodic routing protocol hello messages or other messages to determine the data loss on a network link.

FIG. 2 shows a process flow chart, executed on one or more processors, for calculating a measure of link loss, according to some embodiments of the present invention. In some embodiments, link loss is determined by dividing the number of packets received in a time interval by the number of packets sent. This can be calculated using existing data in the messages such as sequence numbers, by repurposing unused data fields in the message or by augmenting the message. Referring to FIG. 2, the invention selects an existing traffic data packet (for example, a protocol message) and checks to see if the existing traffic packet includes a sequence number (or any other data that is unique to this packet), in block 202. If the packet does not include a sequence number, the invention adds a sequence number to the packet, in block 204. The packet is then transmitted to a receiving participating node at the other end of the link, in block 206. In block 208, the sequence number is extracted from the received packet. The total number of missing frames with respect to the number of transmitted frames provides the loss percentage. As a simplified example, using a sliding 10 second window, if messages sequenced 100 through 109 are transmitted but the receiver only receives 100 through 107 and 109, a 10% loss would result. The above processes are repeated for an interval of time in block 210. At the end of the time interval, in block 212, the invention compares the number of packets received to the number of packets expected and then determines data loss per time interval on the link through which the packets were transmitted, in block 214. For example, the invention determines the link loss by dividing the number of packets received by the receiving participating node in a time interval by the number of packets expected.

Figure 3:
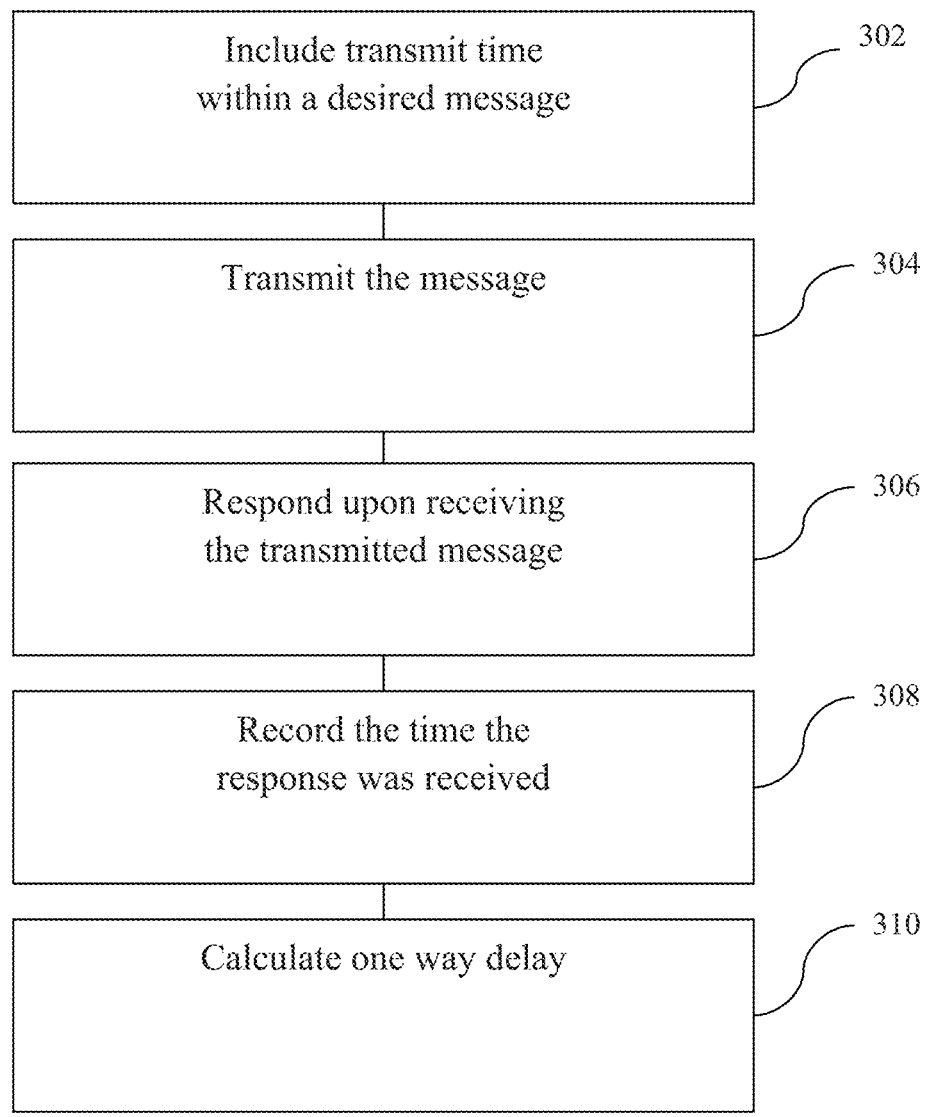
FIG. 3 illustrates a process flow chart for calculating a measure of link delay, according to some embodiments of the present invention.

FIG. 3 illustrates a process flow chart, executed on one or more processors, for calculating a measure of link delay, according to some embodiments of the present invention. Network delay or link delay is the amount of time it takes for data transmitted from one node at one end of the link to reach another node at the other end of the link. If the network provides time synchronization, simply inserting the transmit time into the data and calculating the difference between the transmit time and when the data is received at the next node. In the absence of time synchronization, round trip packets are required and half of the value is the estimated delay. This value assumes symmetric links. Other more sophisticated link delay estimation approaches are possible using the same or similar data. As shown in block 302, the invention includes, for example by using time stamping, the transmit time within a traffic packet of interest and transmits the packet to a receiving participating node at the other end of the link, in block 304. Time stamping can be provided by the operating system for the message being used to transmit the data. The receiving node then immediately or after a predetermined amount of time sends a response to the transmitting node, upon receiving the transmitted packet, in block 306. The transmitting node then records the time the response was received from the receiving participating node, in block 308. In block 310, the invention the estimates the round trip delay as the difference between the transmit time and the time the response was received minus the processing time taking into account the predetermined amount of time as the round trip delay of the packet through the link. Processing time can be configured as a static value, assumed to be zero, or measured as part of the implementation depending on the accuracy desired. Half of this number is an estimate of the one way delay of the link. The method employed in this embodiment assumes that network links have symmetric delays in each direction.

Figure 4:
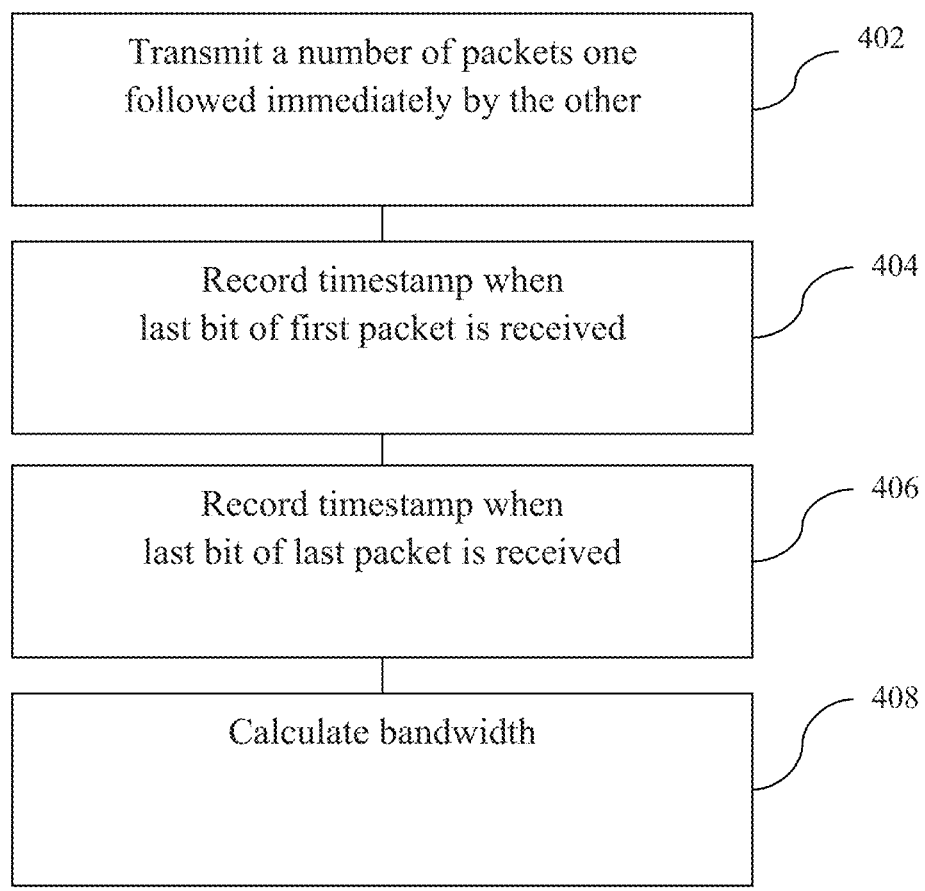
FIG. 4 depicts a process flow chart for calculating a measure of link bandwidth, according to some embodiments of the present invention.

FIG. 4 depicts a process flow chart, executed on one or more processors, for calculating a measure of fink bandwidth, according to some embodiments of the present invention. In some embodiments, link bandwidth is measured using the time difference between receiving two adjacent data frames and dividing it into the size of the second larger data frame. This can be done with crafted probe messages, or a series of opportunistically identified packets that already exist on the network. Messages can be identified by examining the protocol state machine or existing message transmission schedule as previously discussed. Taking advantage of sequentially transmitted frames, the receiving node can locally timestamp the reception of the last bit of the first message as well as the second message. The difference between these two message reception times is the transmit time for the amount of data contained in the second message. Simple arithmetic provides an estimate of the bottleneck bandwidth of the link between the two points. For example, the link bandwidth can be determined as the size of the larger packet divided by the time delta (difference) measured at the receiving node.

In block 402, the transmitting node sends a number of packets (at least two) one immediately following the other. The resolution of the measurement is maximized if the second or a subsequent packet is larger than the first packet. The receiving node then records the time (e.g., using a timestamp) when last bit of the first packet is received at the receiving node, in block 404. In block 406, the receiving node records the time when last bit of the last packet in the hack-to-back sequence was received at the receiving node. The invention then determines the link bandwidth as the size of the received data (all packets) less the first packet divided by the time difference between when the first bit of the first packet was received and when the last bit of the last back-to-back packet was received at the receiving node, taking into account the predetermined amount of time.

Figure 5:
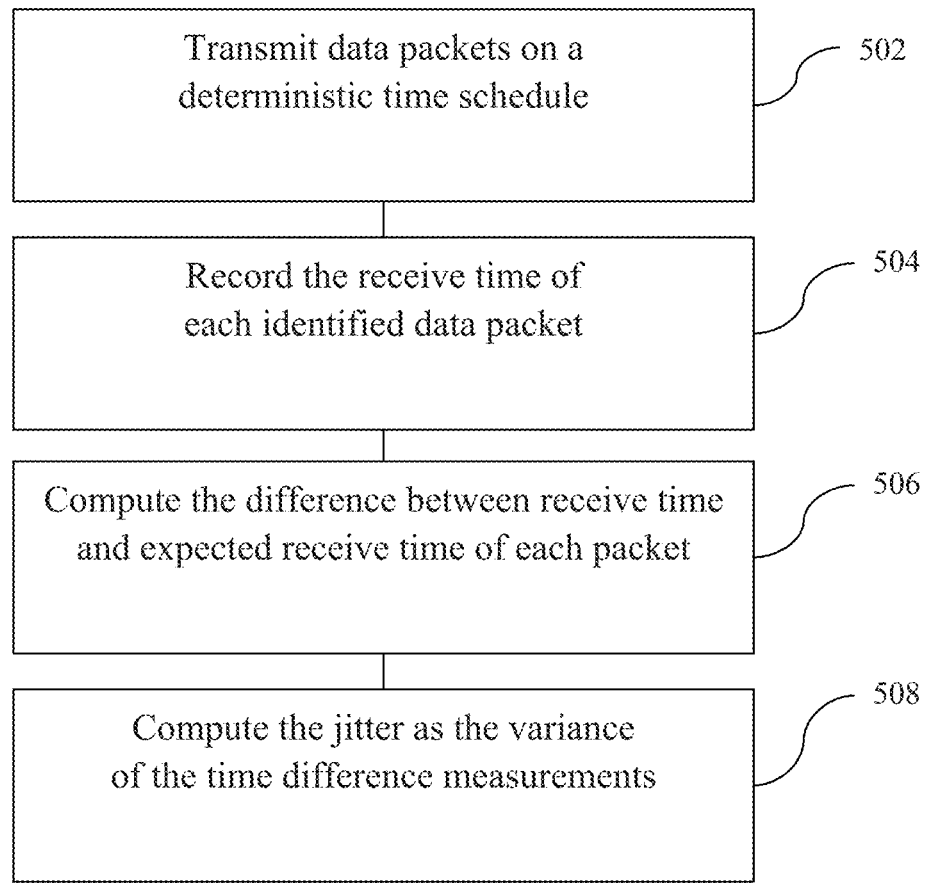
FIG. 5 shows a process flow chart for calculating a measure of link jitter, according to some embodiments of the present invention.

FIG. 5 shows a process flow chart, executed on one or more processors, for calculating a measure of link jitter, according to some embodiments of the present invention. Link jitter or network jitter is a measure of the variation of the network or link latency. In some embodiments, a deterministic transmit schedule of messages is used by the receiver to determine the transmit schedule. A receiving node requires knowledge of this transmit schedule and can measure the delay variation between the scheduled transmit times and the received messages to calculate the jitter. In block 502, the transmitting node sends packets on a predictable deterministic time schedule. A simple example of such a deterministic schedule is keep alive or hello messages transmitted every 2 seconds. In block 504, the receiving node records the receive time of each identified packet. The receiving node then computes the difference between the receive time and expected receive time, in other words, the time difference from the current to the previous packet with respect to the transmit time schedule, in block 506. In some embodiments, the expected receive time is determined from the previously received packet, based on the deterministic transmit schedule. Again, a simple example is a hello message on a 2 second transmit schedule. The receiver gets two hello messages 2.05 seconds apart. The difference is 0.05 seconds from expected receive time. The receiving node then calculates the jitter from the delta time measurements, in block 508. Extending the previous example, the 0.05 second time delta is combined with other time delta measurements over a selected time interval and the jitter average and variance can be calculated. Optionally, the calculated jitter may be updated with newly calculated time difference of the newly received packets.

The method of the present invention provides a way for routing and other protocols to be adapted or created to measure multiple real time metrics to construct the most efficient routes without significantly increasing network overhead. The method of the present invention is also superior to using locally sourced metrics, when routing over unknown intermediate networks. In this case, the local metrics only pertain to the connection to the intermediate network edge, not the path across.

It will be recognized by those skilled in the related fields that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method executed by one or more processors for determining link characteristics of a network link, the method comprising:
examining a plurality of existing network traffic packets and protocol state machines of the network link to identify one or more existing network traffic packets that include unique data unique to respective ones of said plurality of existing network traffic packet;
selecting one or more existing network traffic packets from the identified one or more existing network traffic packets that include unique data, wherein the unique data includes information about a receiving network node having predetermined knowledge about the packets it should receive;

transmitting the selected one or more network traffic packets from a transmitting network node to the receiving network node;

receiving the transmitted one or more network traffic packets by the receiving network node;

examining, by the receiving network node, the received one or more network traffic packets to determine the link characteristics of a network link between the transmitting network node and the receiving network node, according to said predetermined knowledge about the packets, wherein the link characteristics is a link bandwidth;

transmitting a first traffic packet to a receiving participating network node, by the transmitting network node;

transmitting a second traffic packet larger than the first traffic packet to the receiving participating network node, by the transmitting network node;

recording the time when last bit of the first traffic packet is received at the receiving node;

recording the time when last bit of the second traffic packet is received at the receiving node; and determining the link bandwidth as the size of the larger packet divided by the time difference between when the last bit of the first packet is received and when the last bit of the second packet is received, at the receiving node.

2. The method of claim 1, wherein the predetermined knowledge about the packets includes one or more of time schedule, the number of packets sent in a given period, and the fact that two packets were transmitted back-to-back.

3. A method executed by one or more processors for determining link characteristics of a network link, the method comprising:

examining a plurality of existing network traffic packets and protocol state machines of the network link to identify one or more existing network traffic packets that include unique data unique to respective ones of said plurality of existing network traffic packet;

selecting one or more existing network traffic packets from the identified one or more existing network traffic packets that include unique data, wherein the unique data includes information about a receiving network node having predetermined knowledge about the packets it should receive;

transmitting the selected one or more network traffic packets from a transmitting network node to the receiving network node;

receiving the transmitted one or more network traffic packets by the receiving network node;

examining, by the receiving network node, the received one or more network traffic packets to determine the link characteristics of a network link between the transmitting network node and the receiving network node, according to said predetermined knowledge about the packets, wherein the link characteristics is a link jitter;

transmitting a plurality of traffic packets to a receiving participating network node, by the transmitting network node, on a deterministic time schedule;

recording the time of each identified message which is configured a priori;

computing a time difference between a receive time and an expected receive time of the traffic packet with respect to the transmit time schedule, by the receiving participating network node; and calculating the link jitter from the delta time measurements, by the receiving participating network node.

4. The method of claim 3, further comprising updating the calculated link jitter with newly calculated time difference of the newly received packets.

5. The method of claim 3, further comprising estimating the expected receive time from a previously received package, based on the deterministic time schedule.

* * * * *